United States Patent
Conete et al.

(10) Patent No.: US 12,196,157 B2
(45) Date of Patent: Jan. 14, 2025

(54) TURBOMACHINE TURBINE ASSEMBLY

(71) Applicant: SAFRAN CERAMICS, Le Haillan (FR)

(72) Inventors: Eric Conete, Moissy-Cramayel (FR); Benoit Carrere, Moissy-Cramayel (FR); Thomas Vandellos, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/250,964

(22) PCT Filed: Oct. 29, 2021

(86) PCT No.: PCT/FR2021/051911
§ 371 (c)(1),
(2) Date: Apr. 27, 2023

(87) PCT Pub. No.: WO2022/090674
PCT Pub. Date: May 5, 2022

(65) Prior Publication Data
US 2023/0407816 A1    Dec. 21, 2023

(30) Foreign Application Priority Data
Oct. 30, 2020    (FR) .................................. 2011139

(51) Int. Cl.
*F02K 1/80*    (2006.01)
(52) U.S. Cl.
CPC ..................................... *F02K 1/80* (2013.01)
(58) Field of Classification Search
CPC ............... F02K 1/04; F02K 1/827; F02K 1/80
See application file for complete search history.

(56) References Cited

U.S. PATENT DOCUMENTS 4,907,743 A * 3/1990 Bouiller ................... F02K 1/80
239/397.5
7,584,621 B2 * 9/2009 Spitzer .................... F01D 25/30
60/39.5

(Continued)

FOREIGN PATENT DOCUMENTS

FR    3115827 A1 *  5/2022    ............... F02K 1/04
FR    3115828 A1 *  5/2022    ............... F02K 1/04

(Continued)

OTHER PUBLICATIONS

France Search Report and Written Opinion mailed Jul. 12, 2021, issued in Application No. FR2011139, filed Oct. 30, 2020, 7 pages.

(Continued)

*Primary Examiner* — Craig Kim
(74) *Attorney, Agent, or Firm* — CHRISTENSEN O'CONNOR JOHNSON KINDNESS PLLC

(57) ABSTRACT

A turbomachine turbine assembly having a longitudinal axis and including an exhaust casing, an ejection cone arranged downstream of the exhaust casing, the ejection cone having an outer annular wall for the flow of a primary air stream and an acoustic box arranged radially inside said outer annular wall. The acoustic box can include a radially inner annular wall and a connection member interposed longitudinally between the exhaust casing and the inner annular wall of the ejection cone. The connection member can be fastened to the exhaust casing and to the inner annular wall. The upstream end of the outer annular wall can be connected to the connection member with a degree of freedom in the radial direction and a degree of freedom in the longitudinal direction.

9 Claims, 2 Drawing Sheets

(56) References Cited

U.S. PATENT DOCUMENTS

| | | | |
|---|---|---|---|
| 8,726,675 B2* | 5/2014 | Keith | F02K 1/00 |
| | | | 60/800 |
| 8,919,136 B2 | 12/2014 | Conete | |
| 10,100,664 B2* | 10/2018 | Renggli | B32B 18/00 |
| 11,519,361 B2* | 12/2022 | Conete | B64D 33/04 |
| 11,746,703 B2* | 9/2023 | Ruthemeyer | F02C 7/20 |
| | | | 60/796 |
| 2011/0203255 A1* | 8/2011 | Conete | F02K 1/80 |
| | | | 239/265.11 |
| 2012/0160933 A1 | 6/2012 | Vauchel et al. | |
| 2018/0066605 A1* | 3/2018 | Todorovic | F02K 1/80 |
| 2021/0293201 A1* | 9/2021 | Conete | F02K 1/80 |
| 2022/0252022 A1* | 8/2022 | Bouillon | F02C 7/24 |
| 2022/0341373 A1* | 10/2022 | Conete | F01D 25/246 |
| 2023/0360626 A1* | 11/2023 | Ishii | F16L 55/033 |

FOREIGN PATENT DOCUMENTS

| | | | | |
|---|---|---|---|---|
| WO | WO-2022096821 A1 * | 5/2022 | | F02K 1/04 |
| WO | WO-2022096832 A1 * | 5/2022 | | F02K 1/04 |

OTHER PUBLICATIONS

International Search Report mailed Feb. 24, 2022, issued in corresponding International Application No. PCT/FR2021/051911, filed Oct. 29, 2021, 6 pages.
Written Opinion mailed Feb. 24, 2022, issued in corresponding International Application No. PCT/FR2021/051911, filed Oct. 29, 2021, 6 pages.

* cited by examiner

TURBOMACHINE TURBINE ASSEMBLY

CROSS-REFERENCE TO RELATED APPLICATIONS

This application is a National Stage of International Application No. PCT/FR2021/051911, filed Oct. 29, 2021, which claims priority to French Patent Application No. 2011139, filed Oct. 30, 2020, the entire disclosures of which are hereby incorporated by reference in their entirety for all purposes.

TECHNICAL FIELD

The present disclosure relates to a turbomachine turbine assembly. It also relates to a turbine comprising such an assembly, to a turbomachine comprising such a turbine.

PRIOR ART

Conventionally, as represented in FIG. 1, a turbofan-type turbomachine 10 includes, from upstream to downstream in the direction of circulation of the gases within the turbomachine 10, a fan 12, a low-pressure compressor 14a, a high-pressure compressor 14b, a combustion chamber 16, a high-pressure turbine 18a, a low-pressure turbine 18b and an exhaust nozzle 20. The high-pressure compressor 14b and the low-pressure compressor 14a are respectively connected to a high-pressure turbine 18a and a low-pressure turbine 18b by a respective shaft extending according to the longitudinal direction X of rotation of the shafts of the turbomachine. Next, the orientation qualifiers, such as "longitudinal", "radial" and "circumferential" are defined with reference to the longitudinal axis X. The airflow entering the turbomachine is split, downstream of the fan 12, into an annular primary air stream entering a so-called primary annular flow path 22a, and into an annular secondary air stream entering a so-called secondary annular flow path 22b which surrounds the primary annular flow path 22a. The low- and high-pressure compressors 14a, 14b, the combustion chamber 16, and the high- and low-pressure turbines 18a, 18b, are located for the working parts in the primary annular flow path 22a.

An exhaust casing 30 is located directly at the outlet of the low-pressure turbine 18b. The exhaust casing 30 includes a radially inner shroud 32 and a radially outer shroud 34. An annular space formed between the inner shroud 32 and the outer shroud 34 forms a portion of the primary annular flow path 22a at the outlet of the low-pressure turbine 14b.

The exhaust nozzle 20, or exhaust nozzle, of a turbomachine 10 conventionally includes an assembly allowing optimizing the flow of hot gases derived from the turbine. This assembly may also have the function of absorbing at least part of the noise generated by the interaction of these hot gases with ambient air and with the cold airflow derived from the fan.

This assembly includes an ejection cone 40, represented in FIG. 2, comprising an upstream portion 40a, with a substantially cylindrical shape, and a downstream portion 40b with a conical shape. The upstream portion 40a is formed by a radially outer annular wall 42 and an acoustic box 44 arranged radially inside the outer annular wall 42. The acoustic box 44 comprises a radially inner annular wall 46.

The radially outer face of the outer annular wall 42 of the upstream portion 40a and the radially outer face of the conical downstream portion 40b delimit, radially inside, the primary annular flow path 22a, at the ejection cone 40.

The ejection cone 40 is connected upstream to the exhaust casing 30 by a connection member 50 interposed longitudinally between the exhaust casing 30 and the ejection cone 40. The upstream end of the ejection cone 40 is connected to the inner shroud 32 of the exhaust casing 30.

Due to the significant temperature gradients exerted between the inner and outer annular walls 42, 46, it is known to mechanically decouple the outer annular wall 42 from the inner annular wall 46, upstream. This has the effect of limiting the thermomechanical stresses applied to the outer annular wall 42. For this purpose, the inner annular wall 46 is securely connected to the connection member 50 whereas the upstream end of the outer annular wall 42 is free in order to enable a free expansion of the outer annular wall 42 with respect to the inner annular wall 46. Thus, an upstream portion of the outer annular wall 42 is disposed radially opposite a radially outer face of the connection member 50.

Nonetheless, such an arrangement has the drawback of forming a radial clearance between the radially outer face of the connection member 50 and the upstream portion of the outer annular wall 42. This radial clearance induces a recirculation of air towards the inside of the acoustic box, i.e. between the inner and outer annular walls 42, 46, of the hot gases coming out of the low-pressure turbine 14b at the junction between the exhaust casing 30 and the ejection cone 40, which decreases the efficiency of the turbine and might reduce the efficiency of the acoustic box 44.

SUMMARY

A turbomachine turbine assembly with a longitudinal axis is provided comprising:
an exhaust casing,
an ejection cone arranged downstream of the exhaust casing, the ejection cone comprising an outer annular wall for the flow of a primary air stream and an acoustic box arranged radially inside said outer annular wall, the acoustic box comprising a radially inner annular wall,
a connection member interposed longitudinally between the exhaust casing and the inner annular wall of the ejection cone, the connection member being fastened to the exhaust casing and to the inner annular wall,
wherein the upstream end of the outer annular wall is connected to the connection member with a degree of freedom in the radial direction and a degree freedom in the longitudinal direction.

This technological proposal allows reducing the thermomechanical stresses of the outer annular wall of the cone and of the inner annular wall of the box since the thermal expansion of each of these two walls could take place independently.

The mounting according to the present document allows achieving a satisfactory aerodynamic stability of the air flow of the primary air flow path thanks to the use of a flexible connection with a degree of freedom in the radial and longitudinal directions. Thus, the circulation of the primary air stream towards a space of the acoustic box located between the outer annular wall and the inner annular wall is limited, and even prevented, at the junction between the outer annular wall and the connection member.

Specific annular sealing means may be provided between the connection member and the upstream end of the outer annular wall.

The downstream end of the outer annular wall of the cone and the downstream end of the downstream annular wall of the casing may be rigidly fastened to each other, the differential thermal expansion between these two walls taking place thanks to the mounting according to the invention made upstream.

The connection member may comprise an outer annular wall including at its downstream end connecting means elastically deformable in the radial direction and in the longitudinal direction.

The outer annular wall of the connection member may comprise a plurality of circumferential tabs, each tab having a first circumferential end connected to the outer annular wall of the connection member and an opposite second circumferential end which is free and which is rigidly fastened at the upstream end of the outer annular wall of the ejection cone.

The use of circumferential tabs allows conferring good flexibility on the tabs compared to longitudinal tabs while having a reduced longitudinal bulk.

The free end of each tab may be convexly rounded and fitted into a recess with a concavely rounded shape of the outer annular wall of the connection member.

The upstream end of the outer annular wall of the cone may be applied radially over an outer radial face of the connection member. In this manner, the tabs are covered by the upstream end of the outer annular wall of the cone, which allows rebuilding a substantially continuous surface over 360° thereby limiting disturbances to the primary air stream.

The connection member may comprise a plurality of elastically deformable lugs spaced apart circumferentially from each other and rigidly fastened, for example by bolting, at the upstream end of the inner annular wall of the acoustic box.

The connection member may comprise a first annular part and a second annular part which are structurally distinct from each other and fastened to each other and to the exhaust casing, the first annular part being that one achieving the connection of the upstream end of the outer annular wall with the connection member with a degree of freedom in the radial direction and a degree of freedom in the longitudinal direction. The second annular part being connected to the upstream end of the inner annular wall of the acoustic box.

Each of the outer annular wall and the inner annular wall may be made of a ceramic matrix composite material. Such a material has a low density and thus enables a reduction in the mass of the ejection cone. The used composite material may be carbide-based or oxide-based, with long or short fibers.

According to another aspect, a turbine is described comprising a turbine assembly as described before.

According to another aspect, a turbomachine is described comprising a turbine as described before.

BRIEF DESCRIPTION OF THE DRAWINGS

Other features, details and advantages will appear upon reading the detailed description hereinafter, and upon analyzing the appended drawings, wherein.

DESCRIPTION OF THE EMBODIMENTS

Figure 1:
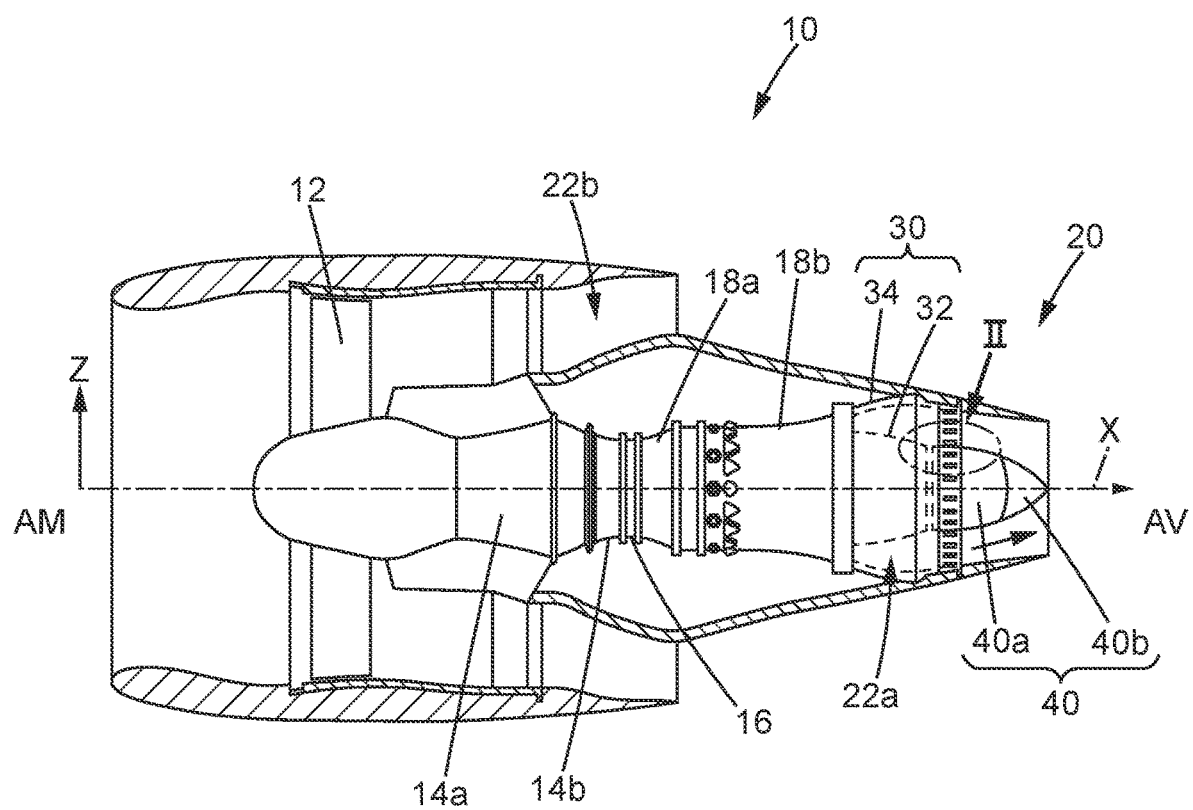
FIG. 1 is a partial schematic half-view in axial section of a turbomachine of the prior art.
Figure 2:
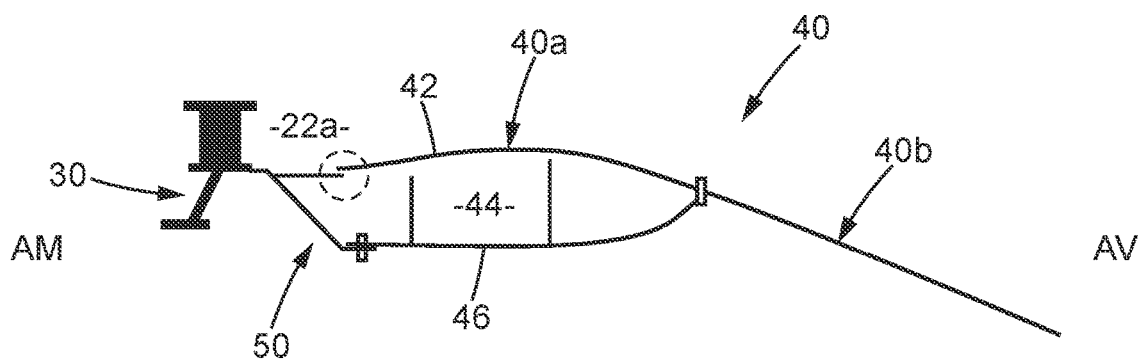
FIG. 2 is a schematic view at a larger scale of the area of FIG. 1 delimited by dotted lines.
Figure 3:
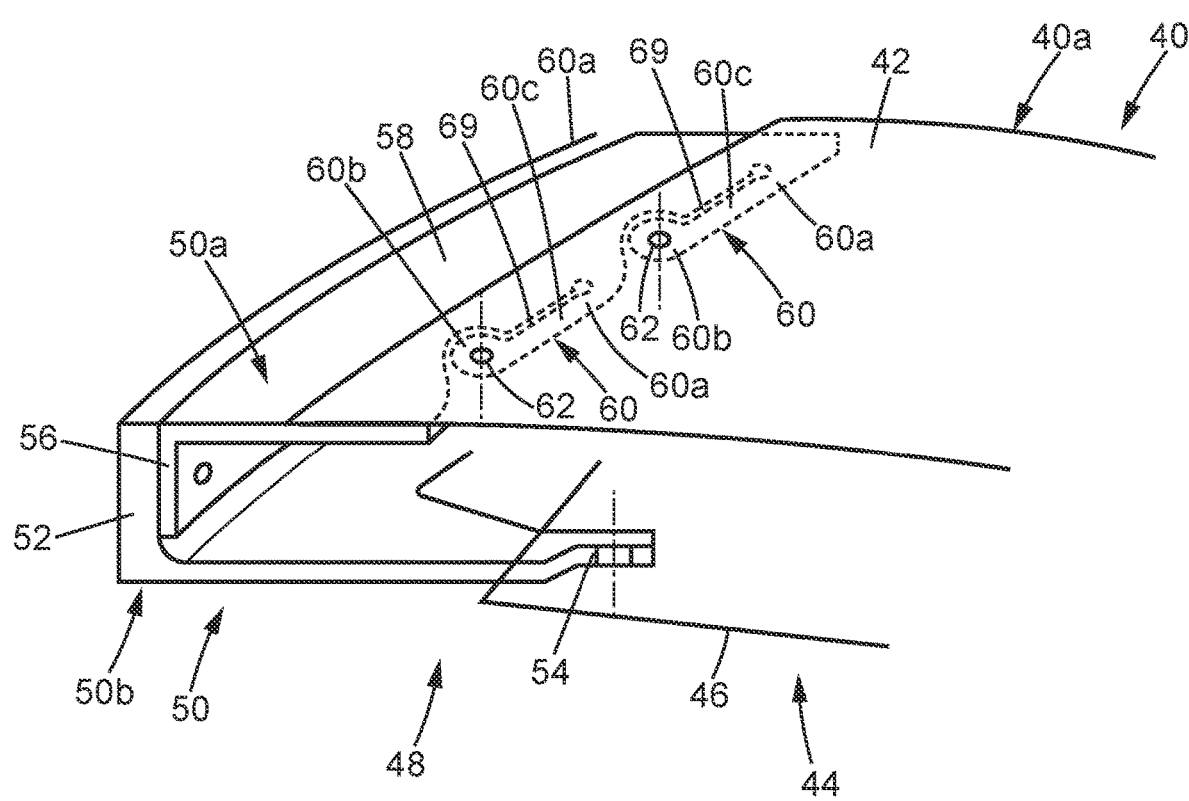
FIG. 3 is a schematic view of an embodiment according to the present document.

Reference is now made to FIG. 3 which represents a turbine assembly 48 according to an embodiment of the present description. Such a turbine assembly can be implemented in a turbomachine with a longitudinal axis as described with reference to FIG. 1.

The assembly further comprises an ejection cone 40. The ejection cone 40 is arranged downstream of the exhaust casing 30 (not represented in FIG. 3). The ejection cone 40 comprises an upstream portion 40a including an outer annular wall 42 for the flow of a primary air stream. The ejection cone further comprises an acoustic box 44 arranged radially inside said outer annular wall 42, the acoustic box 44 comprising a radially inner annular wall 46. The acoustic box may comprise a plurality of partitions extending between the inner annular wall and the outer annular wall so as to form a cellular structure. The outer annular wall 42 may comprise perforations able to let sound waves get inside the acoustic box 44.

Each of the inner and outer annular walls 42, 46 may be made of a ceramic matrix composite material. Such a material has a low density and thus enables a reduction in the mass of the ejection cone 40. The used composite material may be carbide-based or oxide-based, with long or short fibers.

The assembly also comprises a connection member 50 interposed longitudinally between the exhaust casing 30 (not represented) and the inner annular wall 46 of the ejection cone 40. The connection member 50 is fastened, on the one hand, to the exhaust casing 30, and on the other hand, to the inner annular wall 46.

To this end, the connection member 50 comprises a radial annular flange 52 fastened to the inner shroud 32 of the exhaust casing 30. In particular, the radial annular flange 52 may be screwed to the inner shroud 32 and on an annular flange longitudinally opposite the exhaust casing.

The radially inner end of the radial annular flange 52 is connected to a plurality of elastically deformable lugs 54 spaced apart circumferentially from each other and rigidly fastened, for example by bolting, at the upstream end of the inner annular wall 46 of the acoustic box. 44 which is schematically illustrated in FIG. 3.

As shown in FIG. 3, the connection member 50 comprises a first annular part and a second annular part 50b. The second annular part 50b is formed by the radial annular flange 52 for fastening to the exhaust casing 30 and by the flexible lugs 54. The first annular part 50a comprises an upstream annular flange 56 fastened, for example by bolting, to the radial annular flange 52 of the second annular part 50b.

The radial annular flange 56 of the first annular part 50a is connected to an outer annular wall 58 arranged radially opposite the flexible lugs 54 of the second annular part 50b.

The downstream portion of the outer annular wall 58 of the first part 50a comprises means elastically deformable in the radial direction and in the longitudinal direction. In the particular example illustrated in FIG. 3, these means comprise circumferential tabs 60. Each tab 60 comprises a first circumferential end 60a connected to the outer annular wall 58 of the connection member 50 and an opposite second circumferential end 60b which is free and which is rigidly fastened at the upstream end of the outer annular wall 42 of the ejection cone 40.

The downstream edges of the circumferential tabs 60 are circumferentially aligned. Each tab 60 comprises a body 60c elongated in the circumferential direction delimiting with the outer annular wall 58 a slot 69 enabling the deformation of the tab 60. The second circumferential end 60b has a convexly rounded peripheral shape which is fitted into a recess with a corresponding concavely rounded shape of the outer annular wall 58 of the first part 50a of the connection member 50. The second end 60b of each circumferential tab 60 comprises an orifice 62 intended for the passage of a screw for fastening at the upstream end of the outer annular wall 42 of the cone 40. The upstream end of the outer annular wall 42 of the cone is herein applied radially over an outer radial face of the outer annular wall 58 of the first annular part 50a of the connection member 50.

According to the proposed configuration, the upstream end of the outer annular wall 42 is thus connected to the connection member 50 with a degree of freedom in the radial direction and a degree of freedom in the longitudinal direction.

The previously-described assembly enables a decoupling the outer annular wall 42 of the cone 40 and of the inner annular wall 46 of the acoustic box 44, these two walls no longer being fastened to each other, which enables the differential expansions between said two walls in the radial and longitudinal directions, thereby allowing reducing the thermomechanical stresses during the application of the radial thermal gradient to the assembly 48 according to the present document.

Moreover, the aerodynamic stability of the junction between the connection member 50 and the outer annular wall 42 of the cone 40 is ensured thanks to the partial sealing and the resistance under mechanical loading of the outer annular wall 42 of the cone 40.

The invention claimed is:

1. A turbomachine turbine assembly with a longitudinal axis, the assembly comprising:
    an exhaust casing;
    an ejection cone arranged downstream of the exhaust casing, the ejection cone comprising:
    an outer annular wall for the flow of a primary air stream; and
    an acoustic box arranged radially inside said outer annular wall, the acoustic box having a radially inner annular wall; and
    a connection member interposed longitudinally between the exhaust casing and the inner annular wall of the ejection cone, the connection member comprising a first annular part and a second annular part, wherein the first annular part and the second annular part are fastened to each other at their respective upstream ends, the second annular part of the connection member being fastened at its downstream end to the exhaust casing and to the inner annular wall,
    wherein the upstream end of the outer annular wall is operably coupled to a downstream end of the first annular part of the connection member with a degree of freedom in the radial direction and a degree of freedom in the longitudinal direction.

2. The assembly according to claim 1, wherein the second annular part of the connection member comprises an outer annular wall including at its downstream end a connecting portion that is elastically deformable in the radial direction and in the longitudinal direction.

3. The assembly according to claim 2, wherein the connecting portion comprises a plurality of circumferential tabs, each tab having a first circumferential end connected to the outer annular wall of the connection member and an opposite second circumferential end which is free and which is rigidly fastened at the upstream end of the outer annular wall of the ejection cone.

4. The assembly according to claim 3, wherein the free end of each tab is convexly rounded and is configured to be fitted in a recess with a concavely rounded shape of the outer annular wall of the connection member.

5. The assembly according to claim 1, wherein the connection member comprises a plurality of elastically deformable lugs spaced apart circumferentially from each other and operably coupled at the upstream end of the inner annular wall of the acoustic box.

6. The assembly according to claim 1, wherein the upstream end of the outer annular wall of the cone is applied radially over an outer radial face of the connection member.

7. A turbine comprising an assembly according to claim 1.

8. The assembly according to claim 3, wherein each tab comprises a body elongated in the circumferential direction delimiting with the outer annular wall a slot enabling the deformation of the tab.

9. A turbomachine turbine assembly with a longitudinal axis, the assembly comprising:
    an exhaust casing;
    an ejection cone arranged downstream of the exhaust casing, the ejection cone comprising:
    an outer annular wall for the flow of a primary air stream; and
    an acoustic box arranged radially inside said outer annular wall, the acoustic box having a radially inner annular wall; and
    a connection member interposed longitudinally between the exhaust casing and the inner annular wall of the ejection cone, the connection member being fastened to the exhaust casing and to the inner annular wall,
    wherein the upstream end of the outer annular wall is operably coupled to the connection member with a degree of freedom in the radial direction and a degree of freedom in the longitudinal direction,
    wherein the connection member comprises an outer annular wall including at its downstream end a connecting portion that is elastically deformable in the radial direction and in the longitudinal direction, and
    wherein the connecting portion comprises a plurality of circumferential tabs, each tab having a first circumferential end connected to the outer annular wall of the connection member and an opposite second circumferential end which is free and which is rigidly fastened at the upstream end of the outer annular wall of the ejection cone.

* * * * *